United States Patent
Hélot

(10) Patent No.: US 12,409,774 B2
(45) Date of Patent: Sep. 9, 2025

(54) HEADLIGHT FOR A MOTOR VEHICLE

(71) Applicant: AUDI AG, Ingolstadt (DE)

(72) Inventor: Jacques Hélot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 322 days.

(21) Appl. No.: 17/997,614

(22) PCT Filed: Mar. 18, 2021

(86) PCT No.: PCT/EP2021/056891
§ 371 (c)(1),
(2) Date: Feb. 27, 2023

(87) PCT Pub. No.: WO2021/223929
PCT Pub. Date: Nov. 11, 2021

(65) Prior Publication Data
US 2023/0264626 A1    Aug. 24, 2023

(30) Foreign Application Priority Data

May 6, 2020    (DE) .................... 10 2020 112 312.4

(51) Int. Cl.
*B60Q 1/14*    (2006.01)
*B60Q 1/00*    (2006.01)
(Continued)

(52) U.S. Cl.
CPC ......... *B60Q 1/1415* (2013.01); *B60Q 1/0023* (2013.01); *B60Q 1/0458* (2013.01); *H05B 45/10* (2020.01); *H05B 47/165* (2020.01)

(58) Field of Classification Search
None
See application file for complete search history.

(56) References Cited

U.S. PATENT DOCUMENTS 8,536,789 B2 *   9/2013  Chen ................... B60Q 1/143
                                                    315/81
9,511,707 B2    12/2016  Nakamura
(Continued)

FOREIGN PATENT DOCUMENTS

CN    101309815 A    11/2008
CN    104976561 A    10/2015
(Continued)

OTHER PUBLICATIONS

International Search Report and Written Opinion of the International Searching Authority directed to related International Patent Application No. PCT/EP2021/056891, mailed Jul. 1, 2021 with attached English-language translation; 15 pages.
(Continued)

*Primary Examiner* — Srinivas Sathiraju
(74) *Attorney, Agent, or Firm* — Sterne, Kessler, Goldstein & Fox, P.L.L.C.

(57) ABSTRACT

This disclosure relates to a headlight for a motor vehicle comprising a carrier element, on which a plurality of LEDs are arranged, which can be individually controlled in terms of light output, in order to output light according to a predefinable light distribution by means of the headlight. The LEDs are designed as micro-LEDs and at least one sensor element is arranged in an LED-free region of the carrier element.

8 Claims, 3 Drawing Sheets

(51) Int. Cl.
  *B60Q 1/04* (2006.01)
  *H05B 45/10* (2020.01)
  *H05B 47/165* (2020.01)

(56) References Cited

U.S. PATENT DOCUMENTS

| | | | |
|---|---|---|---|
| 9,803,822 B1* | 10/2017 | Salter | F21S 41/13 |
| 10,222,529 B1* | 3/2019 | Cohoon | G02B 6/001 |
| 10,281,113 B1* | 5/2019 | Salter | B60R 19/483 |
| 10,698,114 B2* | 6/2020 | Keilaf | G08G 1/04 |
| 10,920,950 B1* | 2/2021 | Glickman | B60Q 3/30 |
| 11,034,292 B2* | 6/2021 | Glickman | B60R 11/0229 |
| 11,332,066 B2* | 5/2022 | Pecher | F21S 43/14 |
| 11,441,751 B2* | 9/2022 | Ahn | B60R 19/52 |
| 11,592,049 B2* | 2/2023 | Charpentier | F16B 21/09 |
| 11,726,184 B2* | 8/2023 | Ferreira | G01S 17/894 |
| | | | 356/4.01 |
| 2004/0056779 A1* | 3/2004 | Rast | B63B 22/16 |
| | | | 340/985 |
| 2012/0155102 A1 | 6/2012 | Melzner et al. | |
| 2013/0201335 A1* | 8/2013 | Heinemann | G06T 11/001 |
| | | | 348/148 |
| 2014/0177247 A1* | 6/2014 | Roeckl | F21S 43/27 |
| | | | 362/509 |
| 2015/0078022 A1* | 3/2015 | Bauer | F21S 41/176 |
| | | | 362/510 |
| 2016/0200161 A1* | 7/2016 | Van Den Bossche | G01B 11/24 |
| | | | 250/206 |
| 2017/0217359 A1* | 8/2017 | Huettner | B60S 1/0818 |
| 2018/0143304 A1* | 5/2018 | Rosenzweig | G01S 7/4876 |
| 2018/0143306 A1* | 5/2018 | Elooz | G01S 7/4876 |
| 2018/0143324 A1* | 5/2018 | Keilaf | G02B 26/0858 |
| 2019/0073909 A1* | 3/2019 | Neubecker | B60Q 1/508 |
| 2019/0198732 A1* | 6/2019 | Shimizu | H10H 29/142 |
| 2019/0212450 A1* | 7/2019 | Steinberg | G01S 7/4876 |
| 2019/0271769 A1* | 9/2019 | Raly | G05D 1/024 |
| 2019/0385990 A1 | 12/2019 | Chen et al. | |
| 2020/0284883 A1* | 9/2020 | Ferreira | G01S 7/4815 |
| 2021/0229596 A1* | 7/2021 | Pecher | B60Q 1/2603 |
| 2021/0296530 A1* | 9/2021 | Bailey | H10H 20/855 |
| 2021/0370831 A1* | 12/2021 | Kim | B60K 35/60 |
| 2021/0370928 A1* | 12/2021 | Lee | G06V 20/58 |
| 2021/0380123 A1* | 12/2021 | Lim | B60K 31/18 |
| 2021/0387563 A1 | 12/2021 | Junghahnel et al. | |
| 2022/0050203 A1* | 2/2022 | David Keilaf | G05D 1/024 |
| 2022/0080878 A1* | 3/2022 | Kim | G08G 1/205 |
| 2022/0238019 A1* | 7/2022 | Tsuda | G06Q 40/08 |
| 2022/0396266 A1* | 12/2022 | Kim | B60W 40/09 |
| 2023/0101872 A1* | 3/2023 | Kwon | B60W 30/095 |
| | | | 701/26 |
| 2023/0175667 A1* | 6/2023 | Hallitschke | F21S 43/14 |
| | | | 362/520 |
| 2023/0221451 A1* | 7/2023 | Choi | G01S 7/4808 |
| | | | 701/445 |
| 2023/0264626 A1* | 8/2023 | Hélot | F21S 43/50 |
| | | | 315/82 |
| 2023/0368543 A1* | 11/2023 | Lee | G06V 20/58 |
| 2023/0410725 A1* | 12/2023 | Moran | H04N 23/53 |
| 2023/0410726 A1* | 12/2023 | Moran | G06F 3/0412 |
| 2024/0103166 A1* | 3/2024 | Ichiki | G01S 17/58 |
| 2024/0270238 A1* | 8/2024 | Min | B60W 30/0956 |
| 2024/0349411 A1* | 10/2024 | Heo | B60Q 1/2603 |
| 2024/0401766 A1* | 12/2024 | Ko | F21S 43/15 |

FOREIGN PATENT DOCUMENTS

| | | |
|---|---|---|
| DE | 102004007812 A1 | 9/2005 |
| DE | 102005043058 A1 | 3/2007 |
| DE | 202015007063 U1 | 2/2017 |
| DE | 102017219797 A1 | 5/2019 |
| DE | 202020000304 U1 | 3/2020 |
| EP | 1067332 A2 | 1/2001 |
| WO | WO 2019203926 A1 | 10/2019 |
| WO | WO 2020/079060 A1 | 4/2020 |
| WO | WO-2023244693 A1 * | 12/2023 ........... H10H 20/852 |

OTHER PUBLICATIONS

International Preliminary Report on Patentability directed to related International Patent Application No. PCT/EP2021/056891, completed Nov. 23, 2021, with attached English-language translation; 12 pages.

\* cited by examiner

HEADLIGHT FOR A MOTOR VEHICLE

TECHNICAL BACKGROUND

The disclosure relates to a headlight for a motor vehicle with a carrier element, on which a plurality of light emitting diodes is arranged, which are individually controllable with respect to a light output, to output light according to a presettable light distribution by means of the headlight. Moreover, the disclosure relates to a motor vehicle with at least one motor vehicle headlight.

BACKGROUND

Headlights of the generic type as well as motor vehicles with generic vehicle headlights are extensively known in the prior art such that a separate printed evidence is not required hereto. Vehicle headlights of the generic type are for example used as front headlights for illuminating a drive area, into which the motor vehicle is guided during an intended drive operation. Moreover, vehicle headlights can also be reversing headlights, which serve for illuminating a driving area in reversing of the motor vehicle. Moreover, vehicle headlights can also serve for further illumination of the motor vehicle according to regulations, for example for providing a drive illumination, in particular a rear drive illumination, a brake illumination and/or the like.

Generic headlights are often formed in the manner of a pixel headlight. The pixel headlight can for example be formed based on a light emitting diode array or the like. Therein, it is possible that the light emitting diodes are formed or can also be adjusted for outputting light in a preset color. For example, it can be provided that red light emitting diodes are used for realizing a brake light functionality. For realizing a turning functionality, yellow light emitting diodes can for example be used. For front headlights, it can be provided that the light emitting diodes are constructed such that they output substantially white light. For example, this can be realized in that the light emitting diodes comprise a conversion material, which outputs substantially with light upon application with light of a respective light emitting diode, or else in that a respective light emitting diode is multi-part formed, wherein a respective light emitting diode part outputs light in a different color, which in total generates a substantially white light impression. For example, the colors can be red, green and blue.

Moreover, it is usual in the prior art in the meantime, in particular if the motor vehicle comprises one or more driving assistance systems, to provide observation cameras at the motor vehicle to capture the environment of the motor vehicle, in particular during the intended drive operation. Besides observation cameras, however, further sensor units or sensor elements can moreover also be provided, for example radar sensors, temperature sensors, humidity sensors and/or the like. In the prior art, especially the observation cameras are mounted on different positions of the motor vehicle, for example behind a primary edge of a windscreen or else the exterior in a grill.

Even if this prior art has proven itself, thus, disadvantages still become apparent. The plurality of the units and elements results in constructive requirements in a motor vehicle, which can result in joints on the body of the motor vehicle. Moreover, tolerance problems arise thereby, which further aggravate the construction of the motor vehicle, in particular of the body thereof. Incidentally, this is associated with correspondingly high cost.

From US 2019/0385990 A1, a display module and an electronic appliance herewith are for example known. Further, WO 2019/203926 A1 discloses optical multi-stack elements, which use temporal and permanent bonding. Further, US 2019/0198732 A1 discloses light emitting diode sidewalls adaptable to light intensity.

BRIEF DESCRIPTION OF DRAWINGS/FIGURES

DETAILED DESCRIPTION

Figure 1:
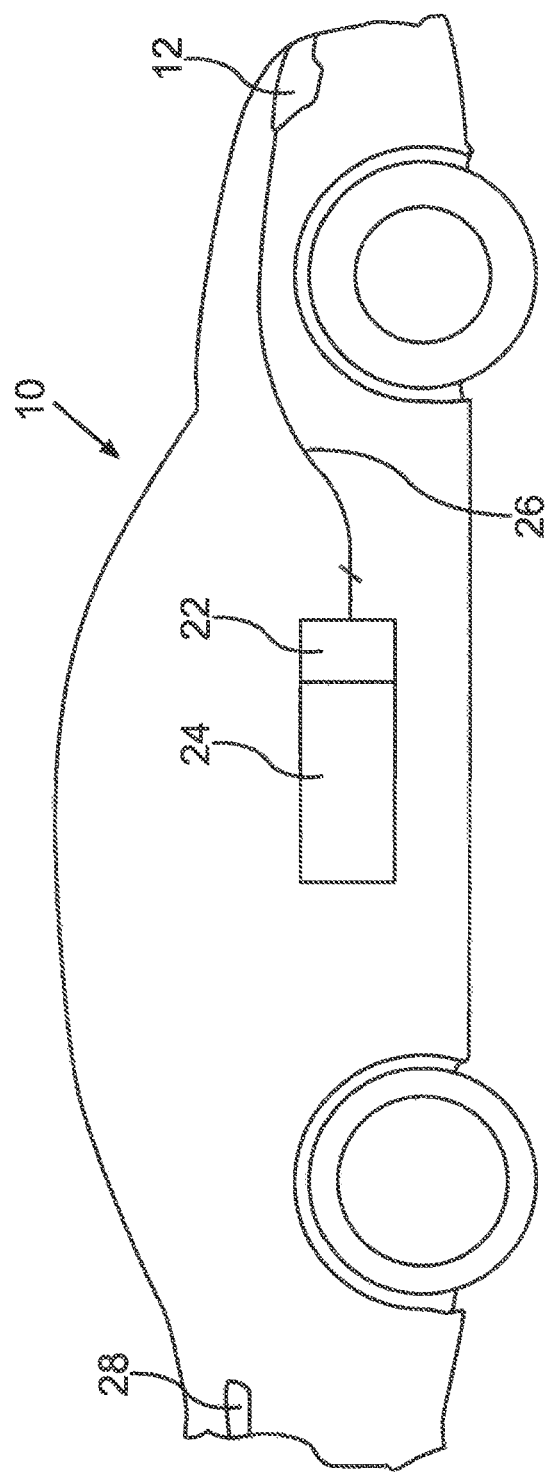
FIG. 1 illustrates a schematic side view of a motor vehicle with a vehicle headlight.

Some aspects of the invention are based on the object to reduce the problems associated with the sensor units or sensor elements.

With some aspects of the invention, a headlight and a motor vehicle according to the independent claims are proposed as a solution.

Advantageous developments arise by features of the dependent claims.

With respect to a generic headlight, it is in particular proposed by some aspects of the invention that the light emitting diodes are formed as micro light emitting diodes and at least one sensor element is arranged in a region of the carrier element free from light emitting diodes.

With respect to a generic motor vehicle, it is in particular proposed by some aspects of the invention that the vehicle headlight is formed as a headlight according to the invention.

Among other things, some aspects of the invention are based on the idea that by integration of the at least one sensor element in the vehicle headlight, the constructive effort with respect to the arrangement of sensor elements on the motor vehicle can be considerably reduced. At the same time, it can be achieved that the at least one sensor element can be integrated in the headlight in simple manner, namely without a particularly great additional effort being required. Therefore, a considerable reduction in effort overall arises for the motor vehicle. In addition, the constructive problems, which can be caused by joints and/or tolerances, can be considerably reduced. Overall, the functionality of the headlight can thus be increased and the effort with respect to the construction of the motor vehicle can be reduced.

Moreover, the sensor elements, for example if they are constituted by cameras and/or sensors or sensor units, can be better integrated in the motor vehicle or the construction thereof with respect to the prior art.

Thus, among other things, some aspects of the invention exploits the idea to also arrange the sensor elements on the same carrier element, on which the light emitting diodes, which are presently formed as micro light emitting diodes, are arranged. Of course, these advantages can also be used at the same time to be able to better configure the appearance of the motor vehicle, in particular its design. Here, some aspects of the invention allows new degrees of freedom.

Micro light emitting diodes are light emitting diodes, which have very small dimensions. Preferably, the micro light emitting diode has an area of approximately one square millimeter or less, particularly preferably an area of about 0.01 square millimeters. The micro light emitting diodes can be connected to the carrier element by known technologies. The micro light emitting diodes can be attached to at least one carrier element by means of a connecting element like an adhesive or the like. However, the micro light emitting diodes can basically also be formed integrally with the carrier element. Thus, the carrier element can for example provide a substrate for the micro light emitting diodes.

Basically, the above also applies to the at least one sensor element, which can for example be formed as a camera or other sensor. Preferably, the sensor element also has very small dimensions and can particularly preferably include an area of about 15 square millimeters or less. The at least one sensor element can be formed as a semiconductor chip and preferably be connected to the carrier element just as the micro light emitting diodes. Moreover, there is of course basically the possibility that the at least one sensor element is also formed integrally with the carrier element.

The carrier element is a component, which can be formed of a substantially rigid material. However, the carrier element can also be formed of a multi-layered material, a composite material and/or the like. For example, the material of the carrier element can be a ceramic, glass or else a plastic, for example a fiber-reinforced plastic, combinations hereof and/or the like. Preferably, the carrier element is integrally formed. According to requirement, however, it can also be provided that the carrier element is formed multi-part. With a multi-part construction of the carrier element, it can be provided that the individual carrier element parts are mechanically connected to each other by means of known connection technologies. The carrier element can also provide an electrical terminal for the micro light emitting diodes and/or the at least one sensor element at the same time. For example, the carrier element can comprise electrical conductor paths in the manner of a circuit board.

Preferably, the carrier element is formed plate-like and comprises a curvature. Basically, the carrier element can be formed as a flat plate, for example with a cornered and/or round edge contour. However, in order to be able to be better adapted to a body of a vehicle, the carrier element is formed curved. The curvature can be convex and/or concave. Preferably, the curvature is formed such that it can fit as seamless as possible into the body in the position, in which the headlight is to be arranged. Therefore, the headlight overall can for example be characterized by a low construction height, which is substantially determined by the thickness of the carrier element as well as of the elements arranged thereon. Moreover, it can of course be provided that the headlight comprises additional elements in the manner of coatings or transparent protective layers to be able to protect the vehicle headlight from external impacts as well as possible during the intended operation on the motor vehicle and/or to allow an adaptation to a contour of the body as good as possible. Such additional elements can for example be a suitable glass layer, plastic layer and/or the like.

According to a development, it is proposed that the carrier element is non-transparently formed and both the micro light emitting diodes and the at least one sensor element are commonly arranged on one of two opposing surfaces of the carrier element. In this configuration, it is preferably provided that the light output by the micro light emitting diodes is effected into a direction facing away from the carrier element. Correspondingly, the at least one sensor element is arranged on the carrier element such that it can sense in a spatial region, which is also facing away from the carrier element. Therefore, neither the light output nor the sensing has to be effected through the carrier element. In such a configuration, the carrier element can be non-transparent and be formed of a corresponding material.

Further, it is proposed that the surface, on which the micro light emitting diodes and the at least one sensor element are arranged, is white or silvery. This configuration can for example be achieved in that the carrier element itself is formed of a white or silvery material. Moreover, it can also be provided that the surface comprises a corresponding coating. The coating can be realized by a varnish, surface processing and/or the like.

According to a development, it is proposed that the carrier element is transparently or opaquely formed and the micro light emitting diodes are arranged on a first one of the two opposing surfaces of the carrier element and the at least one sensor element is arranged on a second surface of the carrier element opposing the first surface. In this configuration, it is in particular provided that either the light output or the sensing is effected through the carrier element. In this configuration, the carrier element can for example be formed of glass or the like. Basically, the carrier element can also be formed of a suitable plastic, for example a suitable acrylic material, based on polyacrylate and/or the like. Of course, combinations hereof can also be provided.

Preferably, the carrier element is opaquely formed and the micro light emitting diodes are arranged such that the light output thereof is effected towards the carrier element. This configuration has the advantage that the recognizability of the individual micro light emitting diodes can become visually blurred by the opaquely formed carrier element and thereby the headlight overall allows a substantially uniform light output across its surface. Moreover, this configuration also allows to make positions, in which the at least one sensor element is arranged and which are not available for the light output, at least partially invisible from the outside by the diffuseness of the light output. Of course, not all of the micro light emitting diodes have to be arranged on a single one of the two surfaces. According to need—a combination can of course also be provided such that the light output is only effected from a part of the micro light emitting diodes through the carrier element.

Moreover, it is proposed that the carrier element is transparently formed and the at least one sensor element captures a region to be captured through the carrier element. In this development, the term transparent relates to the fact that the sensor element can realize its intended sensor function through the carrier element by means of a sensor medium. For example, if it is provided that the sensor element includes a radar sensor, the transparency relates to the transparency with respect to radar signals. Similarly, it can be provided that the sensor element captures infrared light. In this case, it is meant with transparency that the carrier element is transparent to infrared light. Of course, any further configurations hereto can also be provided.

Further, it is proposed that multiple sensor elements are provided, wherein the sensor elements are commonly arranged in a first region of the carrier element, which is formed separately from a second region, in which the micro light emitting diodes are arranged. Thereby, a regional functionality of the vehicle headlight can be provided, namely a region, in which the light output is effected by means of the micro light emitting diodes, and a further region, which serves for sensing by means of the sensor elements. The sensor elements do not have to be identical. Thus, it can for example be provided that a camera is combined with an infrared sensor and a radar sensor as the sensor elements. Further configurations hereto are also conceivable.

According to a further configuration, it is proposed that multiple sensor elements are provided, wherein the sensor elements are each arranged spaced from each other at least by one of the micro light emitting diodes. This configuration has the advantage that the sensor elements can be arranged distributed over the extension of the carrier element on the surface thereof. This equally also applies to the micro light emitting diodes. This allows to permit the sensing over a wide region. This proves particularly advantageous if the headlight is for example used as a front headlight of the motor vehicle and a wide environmental region of the motor vehicle can be captured by means of cameras as the sensor elements due to the curvature. Thereby, it is for example possible to be able to at least partially also capture lateral regions and thus to be able to capture an environment of the motor vehicle as detailed as possible in simple manner. The sensor elements can be at least partially commonly evaluated to be able to capture an environmental situation as needed.

If a sensor element is for example constituted by a camera, the sensor element can include suitable optics. If the sensor element is for example arranged such that it senses through the carrier element, the optics can also be at least partially realized by the carrier element. For this purpose, the carrier element can have a corresponding shaping or also a corresponding local refractive index. Thereby, it is possible to realize lens and/or prism effects to be able to realize or improve the function of the camera.

Of course, the advantages and effects specified for the headlight according to some aspects of the invention similarly also apply to the motor vehicle equipped with the headlight according to some aspects of the invention and vice versa.

Moreover, the motor vehicle can include a control device, which can serve to be able to control at least one vehicle headlight. Basically, the control device can of course also be encompassed by the headlight according to some aspects of the invention. Preferably, the control device is formed to not only supply the micro light emitting diodes with electrical energy in presettable manner, but also to capture sensor signals of the at least one sensor element and provide them to at least one superordinate vehicle control. However, it can basically also be provided that the control device performs a first evaluation of the sensor signals and then provides them for further processing by the superordinate vehicle control. The superordinate vehicle control can for example include a driving assistance system.

The control device for the motor vehicle also belongs to some aspects of the invention. The control device comprises a processor device, which is configured to perform an embodiment of the method according to the invention. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise a program code, which is configured, upon execution by the processor device, to perform the embodiment of the method according to some aspects of the invention. The program code can be stored in a data memory of the processor device.

Preferably, the motor vehicle according to some aspects of the invention is configured as a car, in particular as a passenger car or truck, or as a passenger bus or motorcycle.

The invention also includes the combinations of the features of the described embodiments.

In the following, embodiments of the invention are described.

The embodiments explained in the following are preferred embodiments of the invention. In the embodiments, the described components of the embodiments each represent individual features of the invention to be considered independently of each other, which also each develop the invention independently of each other. Therefore, the disclosure is to include also combinations of the features of the embodiments different from the illustrated ones. Furthermore, the described embodiments can also be supplemented by further ones of the already described features of the invention.

In the figures, identical reference characters each denote functionally identical elements.

FIG. 1 shows an electric vehicle 10 as a motor vehicle in a schematic side view, which is presently formed as a passenger car. The electric vehicle 10 includes a vehicle control 24, which provides a driving assistance function. Moreover, the electric vehicle 10 includes two front headlights as vehicle headlights 12, of which only the right front headlight is illustrated in FIG. 1. The vehicle headlight 12 is connected to a control device 22, which is communicatively in communication with the superordinate vehicle control 24, via a communication line 26. Correspondingly, the electric vehicle 10 comprises two rear headlights 28, of which the left one is illustrated in FIG. 1. The following explanations for the front headlight 12 are basically also correspondingly transferable to the rear headlight 28, wherefore a further detailed explanation of the rear headlights 28 is omitted. Moreover, some aspects of the invention are of course also correspondingly applicable to nearly any other vehicle headlights or lighting devices, in particular also to lamps in an interior of the electric vehicle 10.

Presently, the vehicle headlight 12 is formed as a pixel headlight, namely based on a plurality of individually controllable micro light emitting diodes 16, as it is explained in the following based on FIGS. 2 and 3. The micro light emitting diodes 16 are individually controllable by means of the control device 22.

Figure 2:
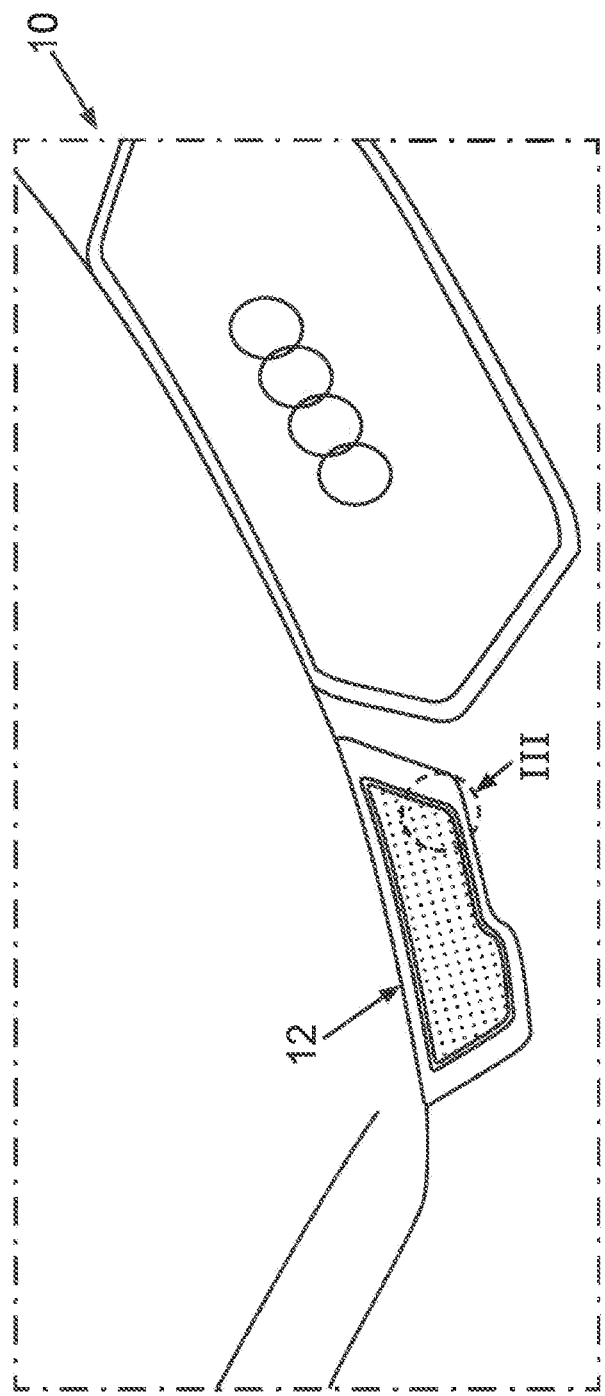
FIG. 2 illustrates a section of a schematic front view of the motor vehicle according to FIG. 1.

FIG. 2 shows a section of a front view of the motor vehicle according to FIG. 1 in an enlarged representation. The right front headlight 12, which is arranged next to a front-side grill, is apparent. The vehicle headlight 12 serves for illumination according to regulations during the intended operation of the electric vehicle 10.

Figure 3:
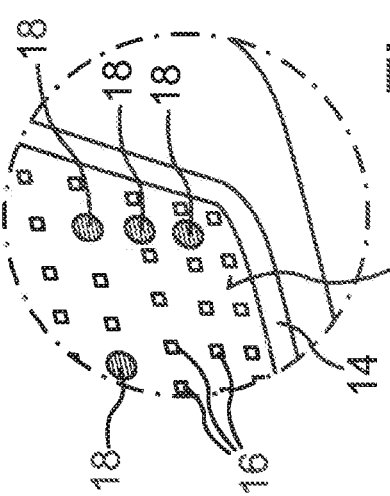
FIG. 3 illustrates an enlarged representation of a region III in FIG. 2.

FIG. 3 shows an enlarged representation of a region III of the vehicle headlight 12 in FIG. 2. It is apparent that the vehicle headlight 12 comprises a carrier element 14, which is presently formed integrally and of glass. A plurality of the micro light emitting diodes 16 is arranged as pixels on the carrier element 14. The micro light emitting diodes 16 are individually controllable by means of the control device 22 such that a presettable light distribution can be achieved by means of the headlight 12 during the intended drive operation. For this purpose, the carrier element 14 includes non-illustrated electrical conductor paths, to which the micro light emitting diodes 16 are connected. The micro light emitting diodes 16 are presently soldered to non-illustrated solder pads of the carrier element 14.

From FIG. 3, it is further apparent that multiple cameras 18 are arranged as sensor elements in a region of the carrier element 14 free from light emitting diodes. The cameras 18 are attached and connected to the carrier element 14 just as the micro light emitting diodes 16.

The carrier element 14 does not have to be necessarily transparently formed, but it can also be formed of a non-transparent glass in alternative configurations. Both the micro light emitting diodes 16 and the cameras 18 are commonly arranged on one of two opposing surfaces 20 of the carrier element 14. In a configuration, it can be provided that the surface 20 is white or silvery. For example, this can be achieved by a suitable coating of the surface 20.

In the present configuration, the carrier element 14 is formed plate-like and comprises a curvature. The shape of the curvature is formed adapted to a shape of a body of the electric vehicle 10. By the plate-like configuration, the headlight 12 can be very flatly formed such that it can be integrated in the body of the electric vehicle 10 in simple manner. Moreover, the curvature of the carrier element 12 allows that the vehicle headlight 12 can be well adapted to an outer contour of the body of the electric vehicle 10, such that a good constructive integration can be achieved. Thereby, the effort for the construction can be reduced and joints can be avoided. In that the vehicle headlight 12 includes not only the micro light emitting diodes 16, but also the cameras 18, the electric vehicle 12 does not have to comprise separate constructional features for the cameras 18. Moreover, besides the constructional effort, tolerance problems, which can be caused hereby, can also be avoided or reduced.

In the present configuration, it is provided that the micro light emitting diodes 16 are formed for the light output of substantially white light. In alternative configurations, the color of the light can of course also vary, for example if the vehicle headlight 12 is to be employed as a rear headlight or the like. Moreover, the vehicle headlight 12 can of course also serve to output turning light signals, for which purpose at least a part of the micro light emitting diodes 16 can then be preferably formed for outputting yellow light.

By the distributed arrangement of the cameras 18 possible according to some aspects of the invention, it can be achieved that a corresponding environment can be visually captured in simple manner. The sensor signals provided by the cameras 18 are also communicated to the control device 22, which performs a first evaluation in this respect and provides the evaluated data to the superordinate vehicle control 24.

Even if the control device 22 is formed separated from the vehicle headlight 12 in the present embodiment, it can be provided in alternative configurations that the control device 22 is arranged at least partially integrated in the vehicle headlight or is a constituent of it.

The vehicle control 22 according to the present embodiment not only serves for connecting the vehicle headlight 12 according to FIG. 1 as it is represented, but also for connecting the second vehicle headlight 12, which is not illustrated in the FIGS.

However, a respective vehicle headlight 12 can basically also include an own individual control device.

Figure 4:
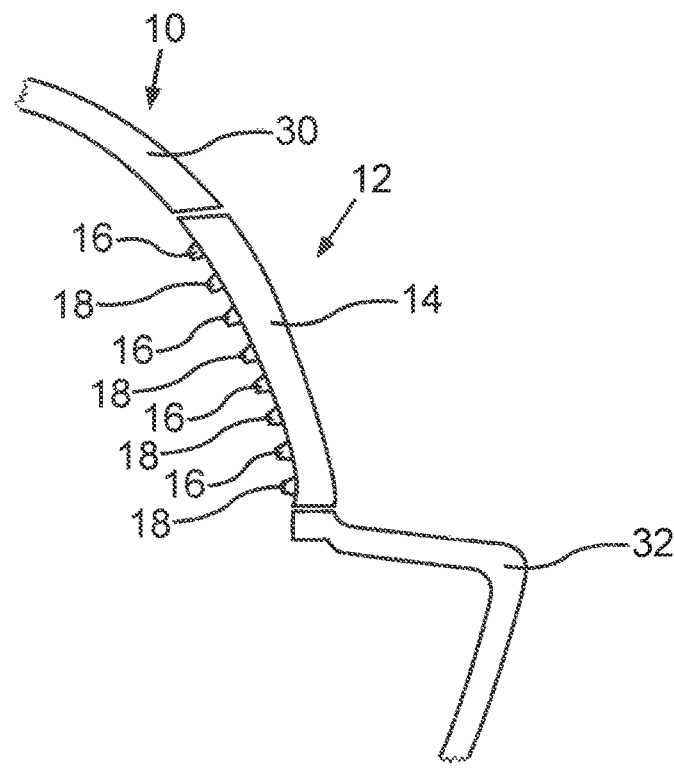
FIG. 4 illustrates a schematic sectional view in the region of the headlight 12 according to FIG. 1 in a first configuration.

FIG. 4 shows a schematic sectional view in the region of the vehicle headlight 12 according to FIG. 1 in a first configuration. It is apparent that a contour of the carrier element 14 is presently formed adapted to an outer contour of a body 30 of the electric vehicle 10. Thereto, the carrier element 14 adjoins to the body 30 to the top and to a front bumper 32 of the electric vehicle 10 to the bottom. Presently, the carrier element 14 is transparently formed, preferably of a glass. On an inner side of the carrier element 14, the micro light emitting diodes 16 and the cameras 18 are arranged. In this configuration, the micro light emitting diodes 16 and the cameras 18 are arranged protected by the carrier element 14.

Figure 5:
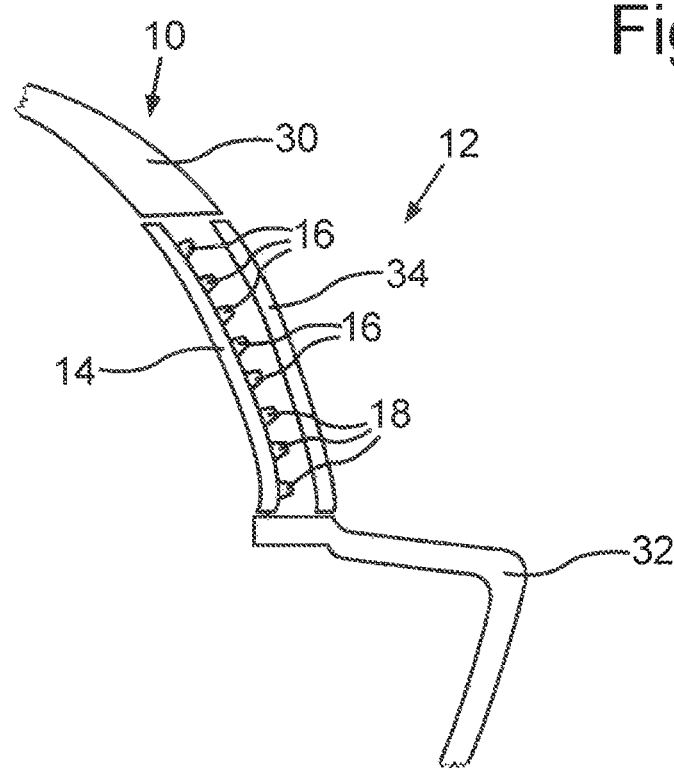
FIG. 5 illustrates a schematic sectional view in the region of the headlight 12 according to FIG. 1 in second configuration.

FIG. 5 shows a schematic sectional view like FIG. 4 in the region of the headlight 12 according to FIG. 1 in a second alternative configuration. Here, the carrier element 14 is opaquely formed. The micro light emitting diodes 16 and the cameras 18 are arranged on an outer side of the carrier element 14. Further, this vehicle headlight 12 includes a cover glass 34, which protects the carrier element 14 with the micro light emitting diodes 16 and the cameras 18. The further features substantially correspond to those as they were already explained to FIG. 4, wherefore reference is made to the corresponding previous explanations in this respect.

The embodiments exclusively serve for explaining some aspects of the invention and are not intended to restrict it.

The invention claimed is:

1. A headlight for a motor vehicle, the headlight comprising:
   a carrier element;
   a plurality of light emitting diodes arranged on the carrier element, the plurality of light emitting diodes being individually controllable with respect to a light output, the plurality of light emitting diodes being configured to output light according to a presettable light distribution, wherein the plurality of light emitting diodes comprise micro light emitting diodes; and
   at least one sensor element arranged in a region of the carrier element free from the plurality of light emitting diodes, such that the plurality of light emitting diodes and the at least one sensor element are arranged on the carrier element,
   wherein the carrier element is transparently or opaquely formed,
   wherein the micro light emitting diodes are arranged on a first surface of two opposing surfaces of the carrier element,
   wherein the at least one sensor element is arranged on a second surface of the two opposing surfaces of the carrier element,
   wherein the second surface, opposing to the first surface, is arranged at a different surface from the first surface, and
   wherein the carrier element is formed plate-like and comprises a curvature.

2. The headlight according to claim 1, wherein the carrier element is opaquely formed and the micro light emitting diodes are arranged such that the light output thereof is effected towards the carrier element.

3. The headlight according to claim 1, wherein the carrier element is transparently formed and the at least one sensor element captures the region to be captured through the carrier element.

4. The headlight according to claim 1, wherein the at least one sensor element comprises multiple sensor elements, wherein the multiple sensor elements are commonly arranged in a first region of the carrier element, the first region being formed separately from a second region, and wherein the micro light emitting diodes are arranged in the second region.

5. The headlight according to claim 1, wherein the at least one sensor element comprises multiple sensor elements, and wherein the multiple sensor elements are each arranged spaced from each other at least by one of the micro light emitting diodes.

6. The headlight according to claim 1, wherein the micro light emitting diodes and the at least one sensor element are arranged on an extension of the carrier element, and wherein the extension of the carrier element is distributed on the first surface and the second surface.

7. A motor vehicle comprising:
    a vehicle headlight; and
    a control device configured to control the vehicle headlight;
    the vehicle headlight comprising:
    a carrier element;
    a plurality of light emitting diodes arranged on the carrier element, the plurality of light emitting diodes being individually controllable with respect to a light output, the plurality of light emitting diodes being configured to output light according to a presettable light distribution, wherein the plurality of light emitting diodes comprise micro light emitting diodes; and
    at least one sensor element arranged in a region of the carrier element free from the plurality of light emitting diodes, such that the plurality of light emitting diodes and the at least one sensor element are arranged on the carrier element,
    wherein the carrier element is transparently or opaquely formed,
    wherein the micro light emitting diodes are arranged on a first surface of two opposing surfaces of the carrier element,
    wherein the at least one sensor element is arranged on a second surface of the two opposing surfaces of the carrier element,
    wherein the second surface, opposing to the first surface, is arranged at a different surface from the first surface,
    wherein the carrier element is formed plate-like and comprises a curvature, and
    wherein the vehicle headlight is formed flush with at least an outer contour of the motor vehicle or the carrier element of the vehicle headlight is transparently formed.

8. The motor vehicle according to claim 7, wherein the micro light emitting diodes and the at least one sensor element are arranged on an extension of the carrier element, and wherein the extension of the carrier element is distributed on the first surface and the second surface.

* * * * *